S. H. STEVENS.
DEVICE FOR ASSISTING VEHICLES UPHILL.
APPLICATION FILED DEC. 9, 1908.
936,828.
Patented Oct. 12, 1909.
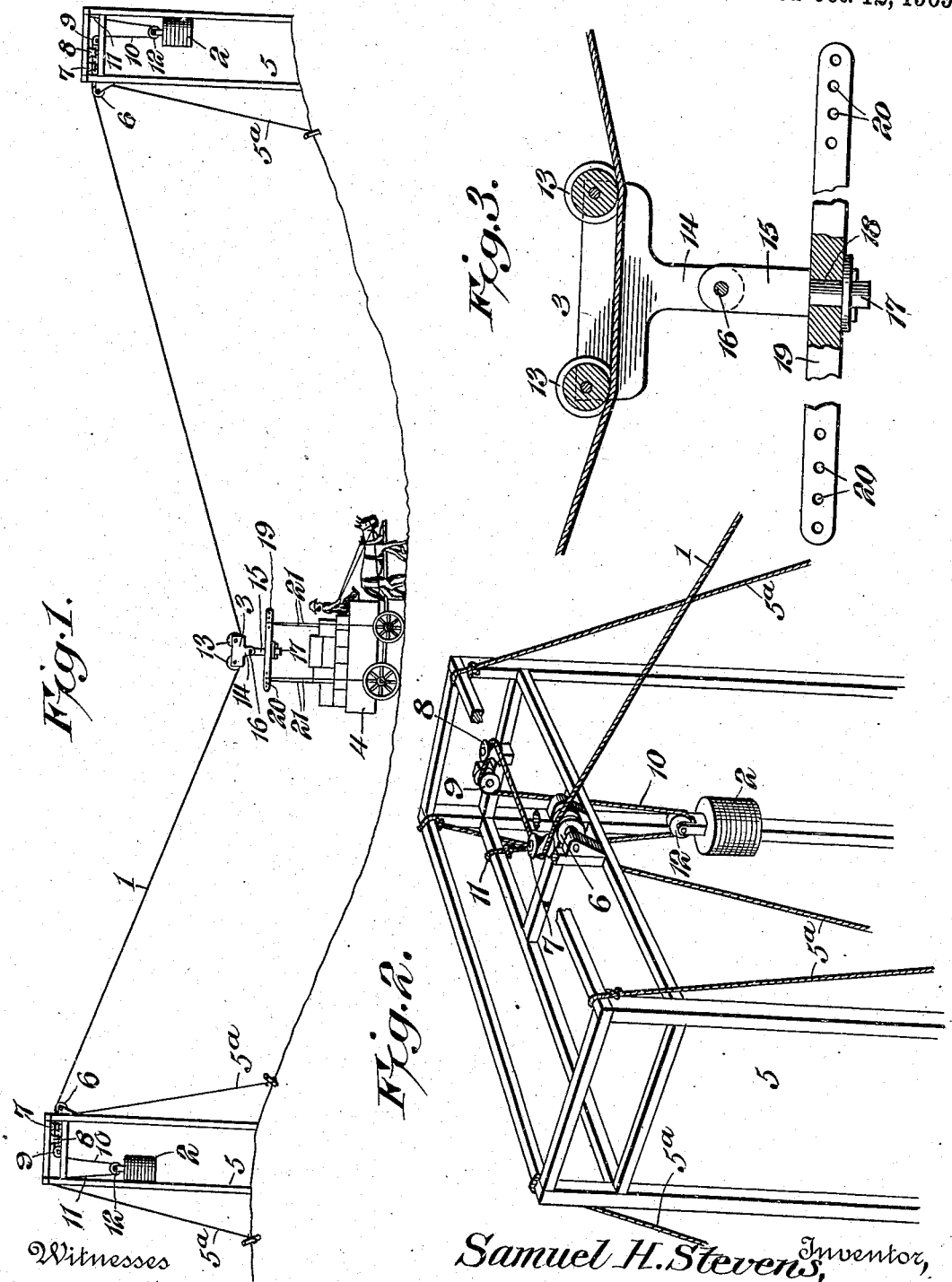
Witnesses
Howard D. Orr.
H. J. Riley
Samuel H. Stevens, Inventor,
By E. G. Siggers
Attorney

UNITED STATES PATENT OFFICE.

SAMUEL H. STEVENS, OF FARMERSVILLE, TEXAS.

DEVICE FOR ASSISTING VEHICLES UPHILL.

936,828. Specification of Letters Patent. Patented Oct. 12, 1909.

Application filed December 9, 1908. Serial No. 466,692.

*To all whom it may concern:*

Be it known that I, SAMUEL H. STEVENS, a citizen of the United States, residing at Farmersville, in the county of Collin and State of Texas, have invented a new and useful Device for Assisting Vehicles Uphill, of which the following is a specification.

The invention relates to a device for assisting vehicles up hill.

The object of the present invention is to provide a simple, inexpensive and efficient device, designed for use in hilly and mountainous countries, and adapted to assist vehicles and especially loaded teams in ascending hills and other steep grades.

A further object of the invention is to provide a device of this character equipped with one or more counter-balancing weights, adapted to be raised by a vehicle when descending a hill or grade, and arranged to descend when the vehicle travels upward, thereby assisting the draft animals and rendering a load much easier to haul up hill.

The invention also has for its object to provide a device having means for connecting a vehicle with it, adapted to admit of a free up and down movement of the front and rear portions of the running gear, and capable of enabling the vehicle to be freely turned at an angle to the apparatus in order to use either side of the road, and adapted also to be adjusted longitudinally of the vehicle to arrange it properly with relation to the center of gravity of the load.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a device, constructed in accordance with this invention, illustrating the manner of assisting a vehicle up hill. Fig. 2 is a perspective view of one end of the apparatus, a portion of the frame-work or support being broken away to illustrate the arrangement of the guide pulleys more clearly. Fig. 3 is an enlarged longitudinal sectional view of the trolley with which the vehicle is connected.

Like numerals of reference designate corresponding parts in all the figures of the drawing.

The device for assisting vehicles up hill comprises in its construction a longitudinal cable 1, weights 2 located at the ends of the device and a trolley 3, provided with means for connecting it with a vehicle 4. The device is designed to extend across the valley or depression lying between two hills, and the weights are arranged to be raised as the vehicle travels down hill, and they are also capable of descending as the vehicle travels up hill. In this manner the weights partially counter-balance the load of the vehicle and to that extent assist the team and render the hauling of a load up hill much easier.

The cable extends between end supports 5, consisting of a frame-work, which may be of any desired construction to secure the necessary strength and will of course vary with the length of the cable and the size of the weights. It also may be desirable to brace the end supports by suitable guy ropes 5ª to secure a structure of the desired stability. Each end portion of the cable 1 passes over a central vertical guide pulley 6 and extends therefrom around inner and outer horizontal guide pulleys 7 and 8 to arrange the weights 2 at one side of the road where it will be out of the way of passing vehicles. The end portion of the cable after passing around the outer horizontal guide pulley 8 passes over an outer vertical guide pulley 9 and is formed into a depending terminal loop 10, the end 11 of the cable being suitably secured to the frame-work of the support, as clearly shown in Fig. 2 of the drawing. The terminal loop is provided for the purpose of increasing the extension of the intermediate portion of the cable with respect to the vertical movement of the weights, but the end loops may be omitted and the weights may be secured to the terminals of the cable, if desired. The weights are provided with suitable pulleys 12, which are arranged in the loops to permit the cable to pass freely through the weights as the latter are raised and lowered.

The trolley, which is designated as a whole by the numeral 3, is provided with a casing extending longitudinally of the cable and preferably composed of two sides or plates between which grooved trolley wheels 13 are mounted. The trolley wheels are arranged to run upon the cable, and the trolley is provided with a depending stem 14, arranged centrally of the casing and having a lower hinged section 15 connected at its upper end of the upper portion or section of the stem by a suitable hinge joint 16, having a transverse pivot or pintle to permit the lower section of the stem to swing longitudinally with respect to the cable to allow for the relative up and down movements of the front and rear portions of the running gear of the vehicle. The lower end of the section 15 of the stem is provided with a vertical pivot 17, extending through a central perforation 18 of a bar or member 19 and adapted to permit the said bar or member to swing horizontally. The pivot is provided with suitable means for retaining the bar or member 19 on it, and the said bar or member when in a horizontal position is adapted to swing horizontally to permit a vehicle to be guided to the right or left without interfering with the proper arrangement of the trolley wheels and casing with relation to the cable.

The bar or member 19, which extends longitudinally of the vehicle, is provided at its ends with perforations 20 for the reception of ropes 21, or other suitable flexible connections for connecting the trolley with the running gear of the vehicle. The front ropes 21 extend downward at each side of the vehicle and are secured to the front bolster, and the rear ropes are secured to the rear axle. The perforations 20 permit the trolley to be adjusted backwardly or forwardly with relation to the vehicle in order to arrange the vertical pivot 18 above the center of gravity of the load. Should the center of gravity of the load of a team be either in advance or in rear of the center of the running gear, the trolley may be adjusted to partially counter-balance most effectively the load of the team and thereby assist the draft animals the full capacity of the device in hauling a load up hill. When the team travels down hill, the weights will be raised and they will descend as the team travels up hill, thereby assisting the team to the extent, which they partially counter-balance the weight of the load. They also, in partially counter-balancing the weight of the load, prevent a too rapid movement of the vehicle when the same is traveling down hill, and obviate an excessive application of the brake, thereby rendering the driving of a team down hill much easier.

Having thus fully described my invention, what I claim as new and desire to secure by Letters Patent, is:—

1. A device of the class described including a cable, a trolley movable along the cable and having means for connecting it with a vehicle, and a weight connected with the cable and arranged to be raised when the vehicle travels down hill and adapted to descend when the vehicle travels up hill, whereby the vehicle is assisted in such upward movement.

2. A device of the class described including a cable, a trolley movable along the cable and provided with means for connecting it with a vehicle, guide pulleys receiving the terminal portions of the cable, and weights connected with the terminal portions and arranged to be raised when a vehicle travels down hill and adapted to descend as the vehicle travels up hill, whereby they assist such upward movement of the vehicle.

3. A device of the class described including a cable, a trolley movable along the cable and provided with means for connecting it with the vehicle, guide pulleys receiving the terminals of the cable, said cable being provided at its ends with loops, and weights connected with the loops and arranged to be raised when the vehicle travels down hill and adapted to descend when the vehicle travels up hill, whereby the vehicle is assisted in such upward movement.

4. A device of the class described including a cable, guide pulleys receiving the end portions of the cable and arranged to locate the terminal portions of the cable at one side of the device, a trolley movable along the cable and provided with means for connecting it with a vehicle, and weights connected with the terminal portions of the cable and arranged to be raised and lowered as the vehicle moves down and up hill.

5. A device of the class described including a cable, a trolley movable along the cable and provided with a longitudinal member having a hinge connected with the trolley and provided with spaced means for connecting it with the front and rear portions of a vehicle, and a weight connected with the cable and arranged to be raised and lowered as the vehicle moves down and up hill.

6. A device of the class described comprising a cable, a trolley movable along the cable and including a member having a horizontal pivotal movement and a vertical swinging movement, and spaced means for connecting the member with the front and rear portions of a vehicle, and a weight connected with the cable and arranged to be raised and lowered as the cable moves down and up hill.

7. A device of the class described comprising a cable, a trolley movable along the cable and including a longitudinal member connected at an intermediate point with the trolley and provided at its end portions with means for connecting it with the front and rear portions of a vehicle at opposite sides thereof, and a weight connected with the cable and arranged to be raised and lowered as the vehicle moves down and up hill.

8. A device of the class described comprising a cable, a trolley movable along the cable and including a longitudinal member connected at an intermediate point with the trolley and provided at its end portions with connecting means for connecting it to the front and rear portions of a vehicle at opposite sides thereof and adjustable with respect to the said connecting means to position the trolley centrally with relation to the center of gravity of a load, and a weight arranged to be raised and lowered as the vehicle moves down and up hill.

9. A device of the class described including a cable, a trolley having spaced wheels arranged to run on the cable and provided with a central stem, a member connected at an intermediate portion with the stem, means for connecting the end portions of the member with a vehicle, and a weight connected with the cable and arranged to be raised and lowered as the vehicle moves down and up hill.

In testimony, that I claim the foregoing as my own, I have hereto affixed my signature in the presence of two witnesses.

SAMUEL H. STEVENS.

Witnesses:
H. L. CARVER,
W. B. YEARY.